(12) United States Patent
Struzinski

(10) Patent No.: US 6,819,230 B2
(45) Date of Patent: Nov. 16, 2004

(54) TARGET TRACK CROSSING PREDICTION/DETECTION

(75) Inventor: William A. Struzinski, New London, CT (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 101 days.

(21) Appl. No.: 10/214,551

(22) Filed: Aug. 8, 2002

(65) Prior Publication Data

US 2004/0030500 A1 Feb. 12, 2004

(51) Int. Cl.[7] ................................................ B60Q 1/00
(52) U.S. Cl. ....................... 340/435; 340/438; 340/961; 701/23; 342/423
(58) Field of Search ................................ 340/435, 438, 340/825.36, 825.49, 961; 701/23, 24, 300, 301, 120; 342/423, 432, 428, 357.01, 357.07, 357.08, 36; 367/907, 909; 180/167, 168

(56) References Cited

U.S. PATENT DOCUMENTS

| | | | | |
|---|---|---|---|---|
| 3,863,257 A | * | 1/1975 | Kang et al. | 342/458 |
| 4,623,966 A | * | 11/1986 | O'Sullivan | 701/301 |
| 5,671,140 A | * | 9/1997 | Bessacini et al. | 701/27 |
| 5,877,998 A | * | 3/1999 | Aidala et al. | 367/124 |
| 6,408,248 B1 | * | 6/2002 | Yancey et al. | 701/301 |

* cited by examiner

Primary Examiner—Daniel J. Wu
Assistant Examiner—Phung Nguyen
(74) Attorney, Agent, or Firm—James M. Kasischke; Michael F. Oglo; Jean-Paul A. Nasser

(57) ABSTRACT

A method and system are provided for predicting and detecting the crossing of two target tracks in a bearing versus time coordinate frame. The method/system use a series of periodic bearing measurements of the two target tracks to determine a bearing rate and a projected intercept with a bearing axis of the bearing versus time coordinate frame. A crossing time $t_c$ for the two target tracks is determined using the tracks' bearing rates and projected intercepts. A prediction that the two target tracks will cross results if a first inequality is satisfied while a detection that the two target tracks have crossed results if a second inequality is satisfied.

18 Claims, 2 Drawing Sheets

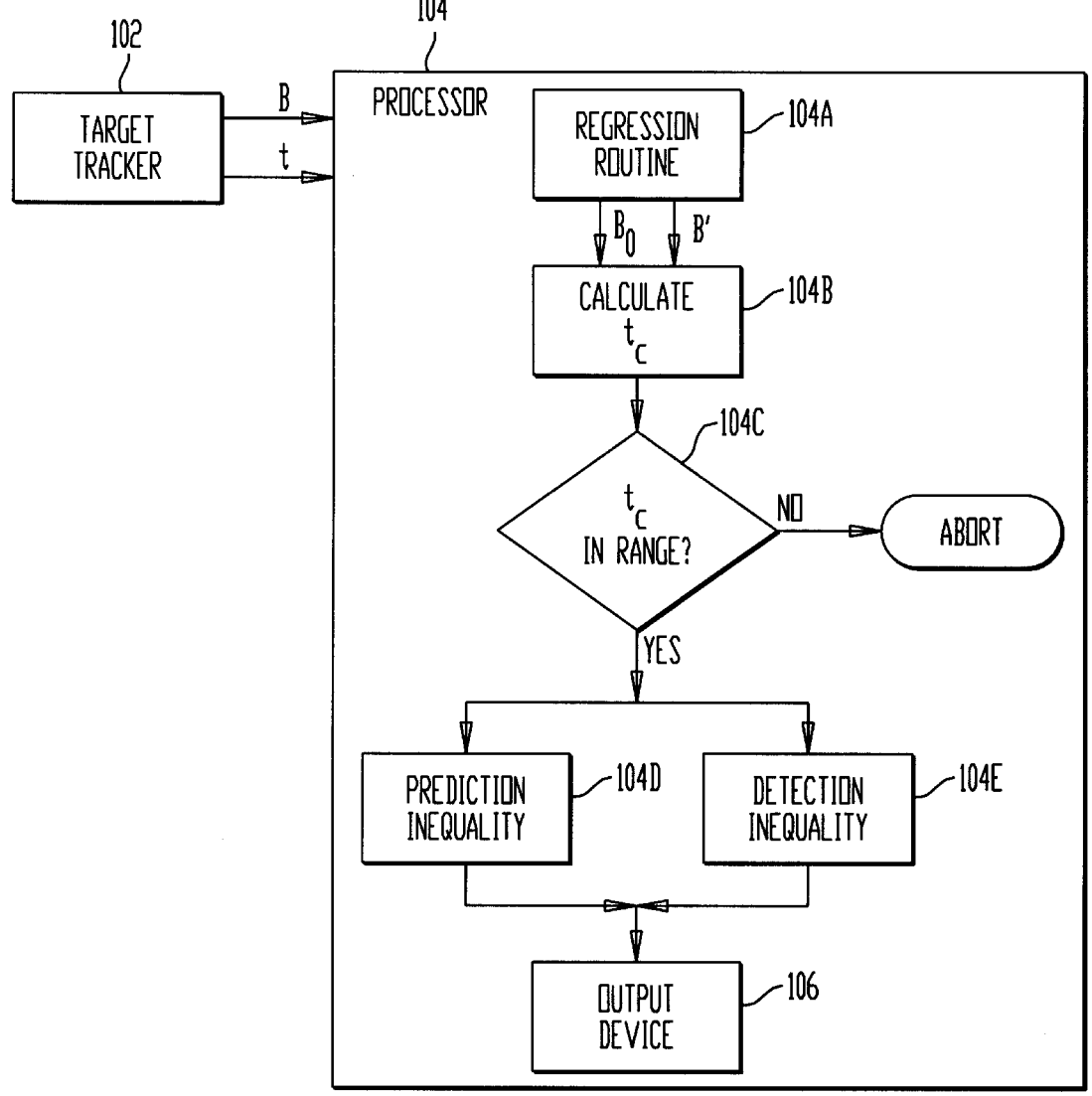

TARGET TRACK CROSSING PREDICTION/DETECTION

STATEMENT OF GOVERNMENT INTEREST

The invention described herein may be manufactured and used by or for the Government of the United States of America for Governmental purposes without the payment of any royalties thereon or therefor.

CROSS REFERENCE TO OTHER PATENT APPLICATIONS

Not applicable.

BACKGROUND OF THE INVENTION

1. Field of the Invention

The present invention relates generally to target tracking systems and methods, and more particularly to a method and system that predicts and detects the crossing of two target tracks observed in a bearing versus time coordinate frame.

2. Description of the Prior Art

State-of-the-art sonar systems utilize automated tracking algorithms to track multiple contacts simultaneously. The tracks are typically displayed in a bearing versus time coordinate frame. The sonar operator studies this display and provides critical analysis that will be utilized by other functions such as navigation. Unfortunately, when two tracks (i.e., contacts) have crossed in bearing, many tracking algorithms give inaccurate bearing measurements or completely lose a track. Such misinformation or loss of information severely impairs the sonar operator's ability to correctly analyze sonar tracking output.

SUMMARY OF THE INVENTION

Accordingly, it is an object of the present invention to provide a method and system of predicting and detecting when two target tracks will cross or have crossed in bearing.

Another object of the present invention is to provide a method and system that can alert one to the possibility of a crossing in bearing or an actual crossing in bearing of two target tracks.

Other objects and advantages of the present invention will become more obvious hereinafter in the specification and drawings.

In accordance with the present invention, a method and system are provided for predicting and detecting the crossing of two target tracks in a bearing versus time coordinate frame. The method and system use bearing measurements provided every K seconds for each of the two target tracks. The bearing measurements are typically provided by a tracking system. A bearing rate and a projected intercept with a bearing axis of the bearing versus time coordinate frame are determined using bearing measurements for the two target tracks over a most-recently occurring window of time defined by (J×K) seconds where J represents the number of samples in a window and is an integer constant that is greater than two. A projected crossing time $t_c$ for the two target tracks is determined using the tracks' bearing rates and projected intercepts. A prediction that the two target tracks will cross results if a first inequality defined as $$(i \times K) < t_c \leq K(i+J)$$

is satisfied. A detection that the two target tracks have crossed results if a second inequality defined as $$K(i-J) \leq t_c \leq (i \times K)$$

is satisfied. In both inequalities, i is a counter that is incremented by one every K seconds.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 2 is a function block diagram of a system used to carry out the method of target track crossing prediction and detection in accordance with the present invention.

DESCRIPTION OF THE PREFERRED EMBODIMENT(S)

Figure 1:
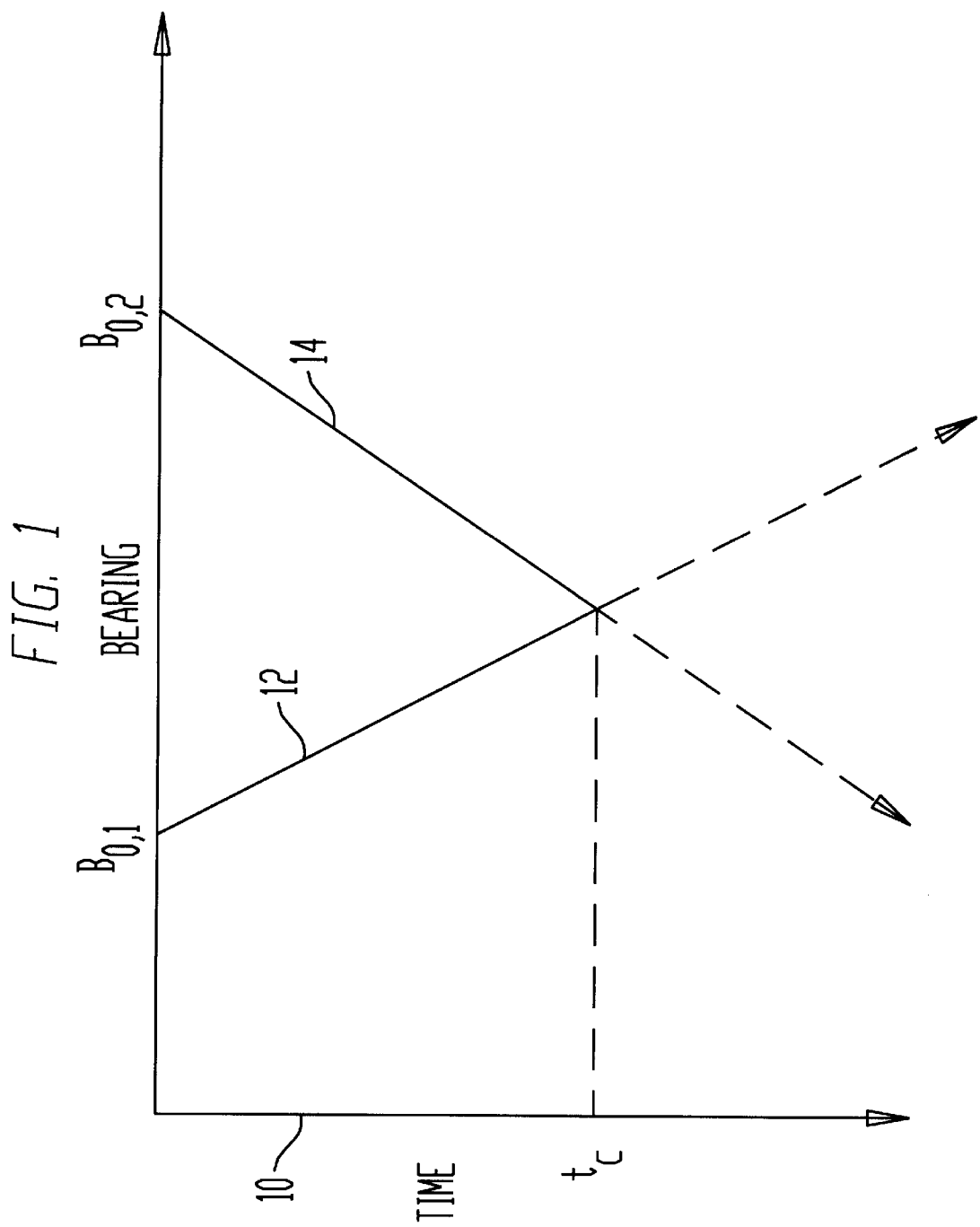
FIG. 1 depicts the tracks of two targets in a bearing versus time coordinate frame.

Referring now to the drawings, and more particularly to FIG. 1, a bearing versus time coordinate frame is illustrated and is referenced generally by numeral 10. As is known in the art of sonar tracking, the bearing versus time coordinate frame is a standard display format. Two target tracks 12 and 14 are displayed in coordinate frame 10 with the solid-line portions thereof representing the track already traversed and the dashed-line portions thereof representing predicted travel in coordinate frame 10 based on the already traversed portions of the tracks. The measurements used for generating a display of tracks 12 and 14 include bearing and time measurements associated with each of tracks 12 and 14. Such measurements are typically provided by a tracking system/algorithm that is not part of the present invention or a limitation thereof.

Referring additionally now to FIG. 2, a system for carrying out the method of the present invention is illustrated. As mentioned above, a target tracker 102 provides continual or periodic bearing (B) and time (t) measurements for a plurality of contacts or targets in given field-of-view. These measurements are typically stored in a track table for current or later processing as is well known in the art. For simplicity of illustration, only two targets (i.e., targets on tracks 12 and 14) will be considered in the description of the present invention. The methodology applied to tracks 12 and 14 can be extended to any two other tracks, or can be iterated for application to three or more tracks.

The bearing and time measurements associated with tracks 12 and 14 are made available to a processor 104 that will, in accordance with the present invention, predict the possible crossing of tracks 12 and 14 and, if it happens, detect the actual crossing of tracks 12 and 14. Before proceeding with a description of the prediction and detection schemes, the notation used herein will be as follows. The subscript "1" will be indicative of measurements/calculations associated with track 12 and the subscript "2" will be indicative of measurements/calculations associated with track 14.

Referring again to FIG. 1, $B_{0,1}$ represents the bearing axis intercept of track 12 and $B_{0,2}$ represents the bearing axis intercept of track 14. The time at which tracks 12 and 14 will cross (assuming their actual tracks continue as shown) is defined as $t_c$ which is in units of time (e.g., seconds).

In general, if two tracks cross, the straightline equations defining them must be equal time $t_c$. That is, $$B'_1 t_c + B_{0,1} = B'_2 t_c + B_{0,2} \tag{1}$$

where $B'_1$ is the bearing rate (i.e., slope) of track 12 and $B'_2$ is the bearing rate of track 14. Solving equation (1) for $t_c$ yields $$t_c = (B_{0,2} - B_{0,1})/(B'_1 - B'_2) \tag{2}$$

Each track's bearing rate and bearing axis intercept can be obtained from a series of the track's bearing measurements available from target tracker 102. For example, a number of samples of bearing measurements and associated times for each track can be input to a regression routine 104A (e.g., a recursive linear least squares fit routine) in order to generate corresponding bearing rate and bearing axis intercept values. While a linear least squares fit routine is preferred, other types of regression routines well known in the art, such as polynomial curve fitting, cubic splines, Chebyshev polynomials, and use of approximating functions and the like, can be used to provide the bearing rate and bearing axis intercept values.

The number of samples used should provide a sufficient statistical sampling. In general, this means more than two samples and, more typically, will mean at least ten samples. Accordingly, it is to be understood that the number of samples J, as well as the time K between samples, is variable.

Next, for any two tracks, processor 104 calculates $t_c$ at 104B in accordance with equation (2). In some cases, $t_c$ may indicate that the tracks will not cross in the time of interest. For example, if $t_c$ has a negative value, the track crossing may have occurred before the time of interest. Conversely, if $t_c$ has an extremely large value, the crossing may occur far in the future. In consideration of these cases, processor 104 can be programmed with an acceptable predetermined range of values for $t_c$ such that the program aborts processing of any tracks for which the value of $t_c$ falls outside of the predetermined range of values. This is illustrated in FIG. 2 by the $t_c$ in-range conditional block 104C.

With $t_c$ calculated, processor 104 predicts or detects the crossing of the two tracks using two inequalities. To predict a track crossing, the first inequality written as $$(i \times K) < t_c \leq K(i+J) \quad (3)$$

is evaluated at 104D where K is the amount of time between bearing measurement samples, J is the number of bearing measurement samples being used, and i is a counter that starts at 1 and is indicative of the number of the most recent sample. Accordingly, the counter i is incremented by 1 for each new sample. Satisfaction of this inequality serves as a prediction that the two tracks (used to calculate $t_c$) will cross at time $t_c$ based on the window of time (i.e, J×K) being evaluated.

To detect an actual crossing of two tracks, the second inequality written as $$K(i-J) \leq t_c \leq (i \times K) \quad (4)$$

is evaluated at 104E. Satisfaction of this inequality serves as a prediction that the two tracks have crossed. Note that only one (or none) of the above inequalities will be satisfied at any increment of i.

The prediction or detection of the crossing of two tracks can be used to trigger an alert. Specifically, the satisfaction of either inequality at 104D or 104E could be used to trigger an audio alert (e.g., tone, beeps, synthesized voice message, etc.), a visual alert (e.g., flashing tracks, message light, actual message, etc.), or both audio and visual alerts at an output device 106. For example, a prediction might only trigger a visual alert whereas a detection might trigger audio and visual alerts. Another possibility is that a prediction would only produce one of an audio or visual alert until $t_c$ is only a few seconds away, at which point both audio and visual alerts would be generated. Accordingly, it is to be understood that the choice and/or combination of choices for alerting one to the prediction or detection of a track crossing is not a limitation of the present invention.

The advantages of the present invention are numerous. Target track crossings can be predicted or detected so that, for example, a sonar operator has advance or actual notice that a track crossing will/has occurred. With such knowledge, the sonar operator can turn off a track, call on a crossing tracks logic routine to resolve any ambiguity, or make other appropriate adjustments.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method of predicting and detecting the crossing of two target tracks in a bearing versus time coordinate frame, comprising the steps of:

providing a tracking system that outputs a bearing measurement B every K seconds for each of said two target tracks;

determining a bearing rate B' and a projected intercept $B_0$ with a bearing axis of said bearing versus time coordinate frame using said bearing measurement for each of said two target tracks over a most-recently occurring window of time defined by (J×K) seconds, where J is an integer constant greater than two; and determining a crossing time $t_c$ for said two target tracks in accordance with $$t_c = (B_{0,2} - B_{0,1})/(B'_1 - B'_2)$$

where $B_{0,1}$ is said projected intercept for a first of said two target tracks, $B_{0,2}$ is said projected intercept for a second of said two target tracks, $B'_1$ is said bearing rate for said first of said two target tracks, $B'_2$ is said bearing rate for said second of said two target tracks;

predicting that said two target tracks will cross if a first inequality defined as $$(i \times K) \leq t_c \leq K(i+J)$$

is satisfied; and predicting that said two target tracks have crossed if a second inequality defined as $$K(i-J) \leq t_c \leq (i \times K)$$

is satisfied, where i is a counter that is incremented by one every K seconds.

2. A method according to claim 1 wherein said step of determining said bearing rate and said projected intercept comprises the step of performing a recursive linear least squares fit using said bearing measurement for each of said two target tracks over said most-recently occurring window of time.

3. A method according to claim 1 further comprising the steps of:

generating a first alert signal when said first inequality is satisfied; and generating a second alert signal when said second inequality is satisfied.

4. A method according to claim 3 wherein said first alert signal is in a visual format.

5. A method according to claim 3 wherein said first alert signal is in an audio format.

6. A method according to claim 3 wherein said first alert signal is in visual and audio formats.

7. A method according to claim 3 wherein said second alert signal is in a visual format.

8. A method according to claim 3 wherein said second alert signal is in an audio format.

9. A method according to claim 3 wherein said second alert signal is in visual and audio formats.

10. A method according to claim 1 further comprising the step of comparing said crossing time $t_c$ to a predetermined range of values wherein said steps of predicting are bypassed if said crossing time $t_c$ is outside said predetermined range of values.

11. A system for predicting and detecting the crossing of two target tracks in a bearing versus time coordinate frame, said system using a tracking system that outputs a bearing measurement every K seconds for each of said two target tracks, said system comprising:

a processor receiving bearing measurements for determining a bearing rate and a projected intercept with a bearing axis of said bearing versus time coordinate frame using said bearing measurement for each of said two target tracks over a most-recently occurring window of time defined by (J×K) seconds, where J is an integer constant greater than two, said processor further determining a crossing time $t_c$ for said two target tracks based upon said bearing rate and said projected intercept for each of said two target tracks, wherein a prediction that said two target tracks will cross results if a first inequality defined as $$(i \times K) \leq t_c \leq K(i+J)$$

is satisfied, and wherein a detection that said two target tracks have crossed results if a second inequality defined as $$K(i-J) \leq t_c \leq (i \times K)$$

is satisfied, where i is a counter that is incremented by one every K seconds; and output means coupled to said processor for generating a first alert signal when said first inequality is satisfied and for generating a second alert signal when said second inequality is satisfied.

12. A system as in claim 11 wherein said output means includes an audio output device for outputting said first alert signal in an audible format.

13. A system as in claim 11 wherein said output means includes a visual output device for outputting said first alert signal in a visual format.

14. A system as in claim 11 wherein said output means includes an audio output device and a visual output device for respectively outputting said first alert signal in audible and visual formats.

15. A system as in claim 11 wherein said output means includes an audio output device for outputting said second alert signal in an audible format.

16. A system as in claim 11 wherein said output means includes a visual output device for outputting said second alert signal in a visual format.

17. A system as in claim 11 wherein said output means includes an audio output device and a visual output device for respectively outputting said second alert signal in audible and visual formats.

18. A system for predicting and detecting the crossing of two target tracks in a bearing versus time coordinate frame, said system using a tracking system that outputs a bearing measurement every K seconds for each of said two target tracks, said system comprising:

a numeric fitting routine receiving the bearing and time for each target and providing the bearing intercept and bearing rate for each target;

a crossing time calculator joined to the numeric fitting routine and receiving the bearing intercept and bearing rate for each target, said crossing time calculator calculating a projected crossing time;

an iterative prediction inequality routine receiving the projected crossing time from said crossing time calculator, said iterative prediction routine providing an indication that the targets will cross in the future;

an iterative detection inequality routine receiving the projected crossing time from said crossing time calculator, said iterative detection routine providing an indication that the targets have crossed in the past;

an output device joined to said iterative prediction inequality routine and said iterative detection inequality routine; and an in-range decision routine receiving the projected crossing time from said crossing time calculator, said in-range decision routine aborting said system if the projected crossing time is outside a predetermined range of values, and said in-range decision routine providing said projected crossing time to said iterative prediction inequality routine and said iterative detection inequality routine if the projected crossing time is within said predetermined range of values.

* * * * *